United States Patent
Oxman et al.

(10) Patent No.: US 10,218,245 B2
(45) Date of Patent: Feb. 26, 2019

(54) FAN-COOLED ELECTRICAL MACHINE WITH AXIAL THRUST COMPENSATION

(71) Applicant: Nuovo Pignone Srl, Florence (IT)

(72) Inventors: Ilia Oxman, Toronto (CA); Vittorio Michelassi, Bayern (DE)

(73) Assignee: Nuovo Pignone Srl, Rorence (IT)

( * ) Notice: Subject to any disclaimer, the term of this patent is extended or adjusted under 35 U.S.C. 154(b) by 415 days.

(21) Appl. No.: 14/916,471

(22) PCT Filed: Mar. 6, 2014

(86) PCT No.: PCT/EP2014/054313
§ 371 (c)(1),
(2) Date: Mar. 3, 2016

(87) PCT Pub. No.: WO2015/032510
PCT Pub. Date: Mar. 12, 2015

(65) Prior Publication Data
US 2016/0218590 A1    Jul. 28, 2016

(30) Foreign Application Priority Data

Sep. 3, 2013   (IT) ................................ FI2013A0204

(51) Int. Cl.
*H02K 9/06*   (2006.01)
*H02K 7/18*   (2006.01)
(Continued)

(52) U.S. Cl.
CPC ............ *H02K 7/18* (2013.01); *F04D 17/122* (2013.01); *F04D 25/06* (2013.01); *F04D 29/041* (2013.01);
(Continued)

(58) Field of Classification Search
CPC .......... H02K 9/06; H02K 7/18; H02K 7/1823; H02K 1/32
See application file for complete search history.

(56) References Cited

U.S. PATENT DOCUMENTS 2,604,501 A * 7/1952 Wightman ............... H02K 9/06
                                                        310/63
4,074,156 A   2/1978 Widstrand et al.
(Continued)

FOREIGN PATENT DOCUMENTS

| CN | 1112519 C | 6/2003 |
|---|---|---|
| CN | 101978169 A | 2/2011 |

(Continued)

OTHER PUBLICATIONS

International Search Report and Written Opinion dated Feb. 26, 2015 which was issued in connection with PCT Patent Application No. PCT/EP2014/054313 which was filed on Mar. 6, 2014.

(Continued)

*Primary Examiner* — Dang Le
(74) *Attorney, Agent, or Firm* — GE Global Patent Operation

(57) ABSTRACT

A rotating machinery equipment is disclosed, including a rotating electrical machine having a stator (1) and a rotating shaft (7), whereon a rotor (11) is mounted. The machinery equipment further includes a cooling fan (23) comprised of a rotating impeller (33) mounted on the rotating shaft (7) for co-rotation therewith. Cooling gas passages (45, 47) are provided for delivering compressed cooling gas through the stator and rotor. The cooling gas is delivered by the impeller (33) into a cooling-gas distribution chamber (31). The pressure of the cooling gas in the cooling-gas distribution chamber generates an axial force balancing the axial thrust generated on the electrical machine by the cooling gas flow.

17 Claims, 5 Drawing Sheets

(51) Int. Cl.
*H02K 7/14* (2006.01)
*F04D 17/12* (2006.01)
*F04D 25/06* (2006.01)
*F04D 29/58* (2006.01)
*F04D 29/051* (2006.01)
*F04D 29/041* (2006.01)

(52) U.S. Cl.
CPC ..... *F04D 29/0516* (2013.01); *F04D 29/5806* (2013.01); *H02K 7/14* (2013.01); *H02K 7/1823* (2013.01); *H02K 9/06* (2013.01)

(56) References Cited

U.S. PATENT DOCUMENTS

| | | | |
|---|---|---|---|
| 4,170,435 A | 10/1979 | Swearingen | |
| 4,562,367 A * | 12/1985 | Kumatani | H02K 7/1025 310/266 |
| 5,862,666 A | 1/1999 | Liu | |
| 6,129,507 A | 10/2000 | Ganelin | |
| 7,775,763 B1 | 8/2010 | Johnson et al. | |
| 7,812,485 B2 * | 10/2010 | Bi | H02K 1/30 310/216.121 |

FOREIGN PATENT DOCUMENTS

| | | |
|---|---|---|
| FR | 2097919 A5 | 3/1972 |
| RU | 2 298 276 C2 | 4/2007 |
| RU | 84 645 U1 | 7/2009 |
| SU | 1035737 A1 | 8/1983 |

OTHER PUBLICATIONS

Italian Search Report and Written Opinion dated Mar. 4, 2014 which was issued in connection with Italian Patent Application No. FI2013A000204 which was filed on Sep. 3, 2013.

First Office Action and Search issued in connection with corresponding RU Application No. 2016105709 dated Sep. 6, 2017.

Machine translation and First Office Action and Search issued in connection with corresponding CN Application No. 201480048691.0 dated Aug. 11, 2017.

\* cited by examiner

FAN-COOLED ELECTRICAL MACHINE WITH AXIAL THRUST COMPENSATION

TECHNICAL FIELD

The present disclosure relates to rotating machines and in particular to rotating electrical machines. Some embodiments of the present disclosure relate to rotating machinery equipment including a rotating electrical machine and a turbomachine drivingly connecting thereto.

BACKGROUND

Electrical machines are often used as prime movers connected to a driven equipment, such as a compressor or a pump. Electrical machines are also used as generators, drivingly connected to a prime mover, such as an internal combustion engine, for example a gas turbine or a reciprocating internal combustion engine.

Electrical machines are sometimes provided with a cooling fan mounted on the shaft thereof, for the generation of a flow of cooling fluid, such as typically a flow of cooling gas. In some known arrangements, electrical motors used as prime movers for turbo-compressors use the same gas processed by the turbo-compressor as cooling medium.

In a high-speed electrical machine there is typically a need to provide a significant flow of cooling gas to maintain the desired low temperature level in the rotor and stator of the electrical machine. In order to overcome the resistance to the cooling gas flow, the cooling fan supported on the shaft of an electrical machine is required to deliver a significant pressure on one end of the electrical machine. The pressure difference thus created along the rotor of the electrical machine results in axial force acting on the rotor of the electrical machine in the direction of the cooling flow, towards the end of the electrical machine opposite the cooling fan, i.e. towards the driven/driving machine connected to the electrical machine. The axial force generated by the cooling flow pressure may become very significant and requires a special thrust compensating device to be used.

Even if a powerful axial thrust compensation device, such as an axial bearing, is located in the machinery connected to the electrical rotating machine to compensate for its own axial force and is capable to compensate the additional force created in the connected electrical machine via the cooling gas flow, still the axial force of the cooling flow on the electrical machine rotor and shaft would make it difficult to select a flexible coupling to connect the shaft of the electrical machine with the shaft of the driven or driving machinery, which is often critical for high speed applications.

There is therefore a need for a different approach to the problem of compensating the axial thrust generated on the shaft of a rotating electrical machine generated by the flow of cooling gas provided by a cooling fan arranged on the electrical machine.

SUMMARY OF THE INVENTION

To reduce the axial thrust generated by the cooling gas pressure, a cooling-gas distribution chamber can be combined with the cooling fan. Cooling gas is delivered by a cooling fan in the cooling-gas distribution chamber at elevated pressure and therefrom distributed towards the electrical machine, e.g. through the gap between the rotor and the stator. The elevated gas pressure in the cooling-gas distribution chamber generates an axial force on the shaft of the electrical machine, which counteracts the axial thrust generated by the cooling-gas pressure on the rotor of the electrical machine. The axial force is oriented generally opposite the cooling-gas flow through the electrical machine.

According to some embodiments, a rotating machinery is provided, comprising a rotating electrical machine having a stator, a rotating shaft and a rotor mounted on the rotating shaft and rotating therewith. The rotating machinery further includes a cooling fan comprised of a rotating impeller mounted at a first end of the rotating shaft and rotating therewith. A cooling-gas distribution chamber is located between the cooling fan and the stator-rotor arrangement. The cooling-gas distribution chamber is in fluid communication with the cooling fan and with cooling gas passages arranged for delivering cooling gas in the electrical machine. Compressed cooling gas delivered by the cooling fan is received in the cooling-gas distribution chamber and distributed therefrom to the cooling gas passages. The cooling fan is provided with a thrust surface facing the stator-rotor arrangement, such that gas pressure in the cooling-gas distribution chamber acting on the thrust surface generates a balancing axial force on the shaft. The thrust surface can be formed by the impeller of the itself, or by a thrust disk added thereto. Since the pressure in the cooling-gas distribution chamber is higher than the pressure at the inlet of the cooling fan, an axial thrust is applied on the shaft whereon the rotor and the cooling fan are mounted. The axial thrust generated by the pressurized cooling gas in the cooling-gas distribution chamber is oriented in a direction generally opposite the flow direction of the cooling gas through the rotor-stator arrangement of the electrical machine, so that the axial force opposes the thrust generated by the flow of pressurized cooling gas flowing through the rotor-stator arrangement.

The compressed cooling gas received in the cooling-gas distribution chamber can entirely or partly flow through the gap between the rotor and the stator. In some embodiments, the cooling gas can be used to remove heat from additional components, elements or parts of the rotating equipment. A cooling gas flow can be used for instance for bearing ventilation. This is particularly useful in case of electromagnetic bearings. The cooling gas can be used also for cooling components of an additional machinery drivingly connected to the electrical machine, for example a compressor, when the electrical machine operates as an electrical motor, or a prime mover, if the electrical machine operates as a generator.

According to a further aspect, the present disclosure relates to a method for balancing an axial thrust generated on a rotating machinery including a rotating electrical machine having a stator, a rotating shaft and a rotor mounted on the rotating shaft and rotating therewith. The method comprises building up a gas pressure by receiving cooling gas in a cooling-gas distribution chamber and generating an axial thrust or axial force acting upon the shaft by means of the cooling gas pressure, the t axial thrust or axial force being oriented in a direction opposite the flow direction of the cooling gas through the rotor-stator arrangement of the electrical machine.

According to some embodiments, the method comprises the following steps: providing a cooling fan comprised of a rotating impeller having an impeller inlet and an impeller outlet and arranged on the rotating shaft; rotating the impeller and delivering compressed cooling gas in a cooling-gas distribution chamber; delivering cooling gas in a cooling-gas flow direction from the cooling-gas distribution chamber towards the rotor and stator; generating a balancing axial force by means of the compressed cooling gas in the cooling-gas distribution chamber, the balancing axial force acting on the shaft in a direction opposite a cooling-gas flow direction.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

According to some embodiments, as will be described in greater detail referring to FIGS. 1, 2, 3, 4 and 5, the thrust compensation arrangement disclosed herein can be embodied in a motor-compressor equipment, comprised of an electrical motor drivingly connected to a compressor, for example a turbo-compressor, such as a centrifugal turbo-compressor. It shall however be understood that the teaching of the present disclosure can also be applied to other kinds of equipment, for example where the electrical rotating machine operates as a generator, rather than as a motor, and is driven into rotation by a prime mover, such as an internal combustion engine, for example a gas turbine.

Figure 1:
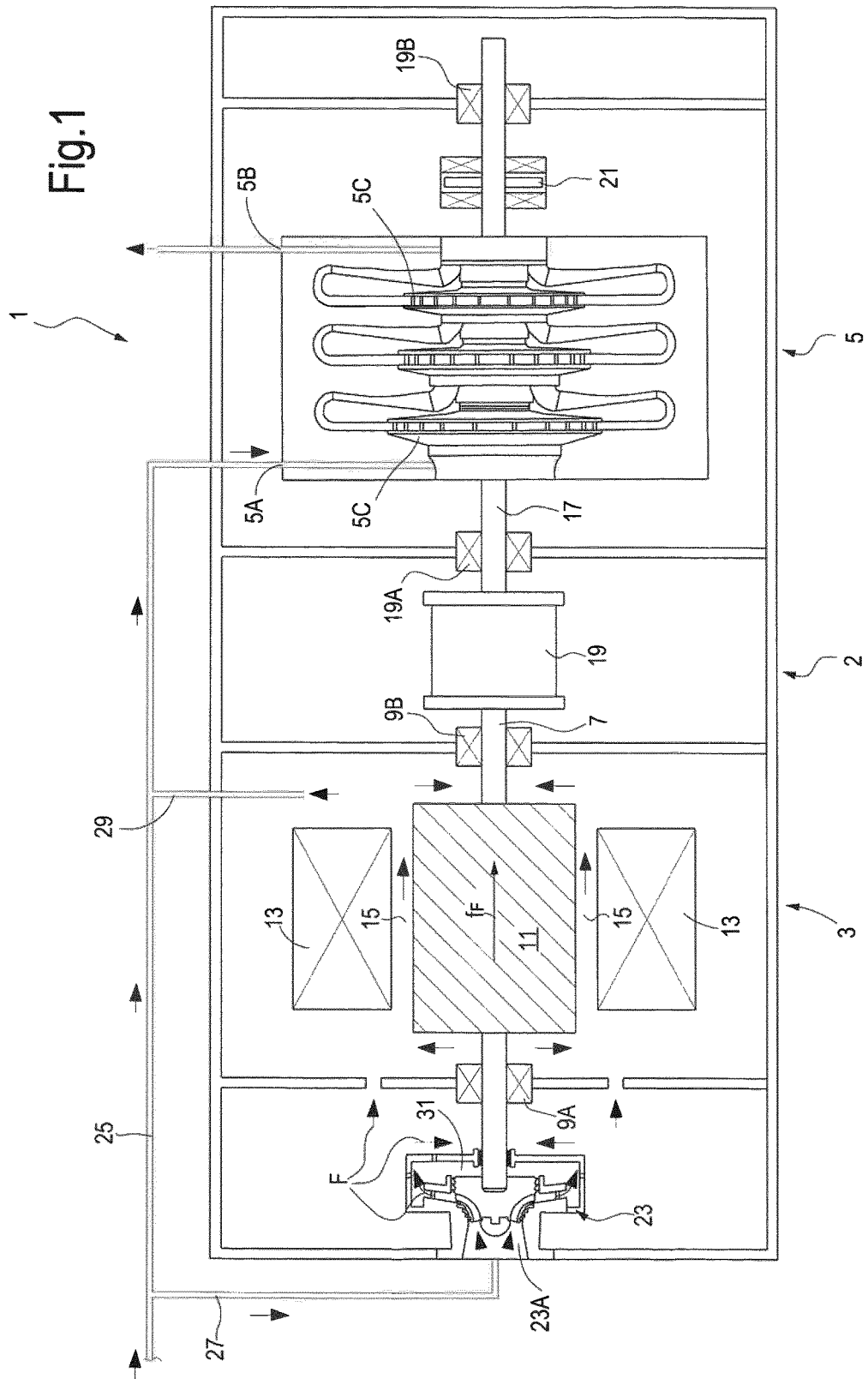
FIG. 1 illustrates a schematic representation of an integrated electrical motor and compressor arrangement.

Turning now to the embodiments illustrated in the drawings, in some embodiments, as shown schematically in the section of FIG. 1, an equipment 1 is provided, comprised of an outer casing 2 housing an electrical motor 3 and a driven load, such as a turbo-compressor 5.

The electrical motor 3 includes an axial shaft 7. The shaft 7 can be supported by bearings, such as end bearings 9A and 9B. In some embodiments the bearings 9A, 9B can comprise rolling bearings. In other embodiments magnetic bearings can be used. In some further embodiments fluid-dynamic, fluid-static, gas or air bearings can be envisaged. Combinations of different bearings can also be provided. Bearings having a thrust supporting capability can also be used, e.g. in combination with radial bearings.

Between the bearings 9A, 9B a rotor 11 can be mounted on the shaft 7 for rotation therewith. A stator 13 is arranged coaxially and around the rotor 11 and is stationarily supported in the casing 2. A gap 15, here below named "air gap", is formed between the rotor 11 and the stator 13.

The shaft 7 of the electrical motor 3 can be mechanically connected to an axial shaft 17 of the turbo-compressor 5 through a suitable coupling 19 arranged between the electrical motor 3 and the turbo-compressor 5. In some embodiments the coupling 19 can be a flexible shaft coupling with low axial load capacity. The shafts 7 and 17 form, together with the shaft coupling, the shafting of the rotating machinery. In some embodiments, not shown, a single shaft can be provided, having no shaft coupling there along.

The turbo-compressor 5 can be a multistage turbo-compressor including two or more impellers 5C mounted on the shaft 17 and driven into rotation by the electrical motor 3 through the flexible shaft coupling 19.

According to some embodiments, the turbo-compressor 5 and the electrical motor 3 can be housed in one and the same enclosure, as schematically shown in FIG. 1, where the enclosure is schematically represented by the housing 2. In other embodiments, the electrical machine and the turbomachine can be housed in different enclosures, a shafting extending from one enclosure to the other for the transmission of mechanical power.

The shaft 17 of the turbo-compressor 5 can be supported by respective bearings. In some embodiments thrust bearings and radial bearings are provided. For instance, end bearings 19A and 19B can be arranged at opposite ends of the shaft 17. In some embodiments an axial bearing or thrust bearing 21 is located in a suitable position along the shaft 17, for example between the turbo-compressor 5 and the radial bearing 19B opposite the coupling 19, i.e. opposite the driven end of the turbo-compressor 5.

The axial thrust bearing 21 can be a roller bearing, a fluid-dynamic, fluid-static, gas or air bearing. In other embodiments the axial thrust bearing 21 can be a magnetic or an electromagnetic bearing. Radial bearings 19A, 19B can also be magnetic or electromagnetic bearings, roller bearings, fluid-dynamic, fluid-static, gas or air bearings, or combinations thereof.

The electrical motor 3 can be provided with a cooling fan 23. The cooling fan 23 can be mounted on the shaft 7 of the electrical motor 3 for co-rotation therewith. If a single shaft or shafting for both the electrical motor 3 and the turbo-compressor 5 is provided, the cooling fan 23 can be mounted on such single shaft.

The cooling fan 23 can be arranged at the end of the shaft 7 opposite the turbomachine, i.e. the turbo-compressor 5 in this embodiment. If a coupling 19 is provided, the cooling fan 23 can be arranged opposite the coupling 19 with respect to the electrical machine, i.e. the cooling fan 23 and the coupling 19 are arranged at opposite sides of the stator-rotor arrangement 13, 11.

In some embodiments the cooling fan 23 can be comprised of one axial-radial impeller a shown in FIGS. 2 through 5. Alternatively, the cooling fan 23 could comprise more than one axial-radial impellers (not shown).

The cooling fan generates a flow F of a cooling medium, such as a cooling gas, which is delivered through the electrical motor 3 and specifically through the air gap 15 between the stator 13 and the rotor 11. The cooling medium flow F can also be used for cooling the bearings 9A, 9B supporting the shaft 7 of the rotor 11.

The cooling fan 23 boosts the pressure of the cooling gas to values sufficient to overcome the hydraulic resistance to the cooling gas flow generated through the cooling gas passages and in particular through the air gap 15.

In some embodiments the gas processed by the compressor 5 can be used as a cooling gas. In such case the cooling gas is diverted from the main gas supply of the turbo-compressor to the cooling fan 23. In some embodiments, the process gas is supplied to a compressor inlet or suction side 5A through a compressor suction line 25. The gas processed by the compressor 5 is then delivered at the final pressure through a gas delivery output 5B of compressor 5. A side duct 27 can be provided, to divert a fraction of the main gas flow towards an inlet 23A of the cooling fan 23, so that the process gas can be used for cooling the electrical motor 3.

The cooling gas flow F flows through the electrical motor 3 and cools the stator-rotor arrangement by flowing through the air gap 15. As mentioned above, in some embodiments the cooling gas flow F can also be used to cool the bearings 9A, 9B of the electrical motor 3. This is particularly useful when electromagnetic bearings are used. The flow of pre-heated cooling gas is further directed to a return duct 29 towards the suction line 25. In other embodiments, not shown, a cooling medium different from the process gas can be used. For instance, ambient air can be used for cooling the electrical motor 3. In some embodiments the exhaust cooling medium can be discharged in the atmosphere, e.g. when air is used as cooling gas.

In order to overcome the hydraulic resistance to the cooling gas flow through the cooling gas path across the electrical motor 3, in particular through the air gap 15, the cooling fan 23 boosts the pressure of the cooling gas at a substantially high value so that a significant pressure is applied on one end of the electrical motor 3. The pressure difference thus created along the rotor of the electrical motor 3 results in an axial force acting on the rotor in the direction of the cooling flow towards the coupling 19, i.e. according to arrow $f_F$ in FIG. 1. In some exemplary embodiments, arrangements are provided for compensating or reducing the axial thrust generated by the cooling gas flow on rotor 11 and shaft 7 of the electrical motor 3.

Figure 2:
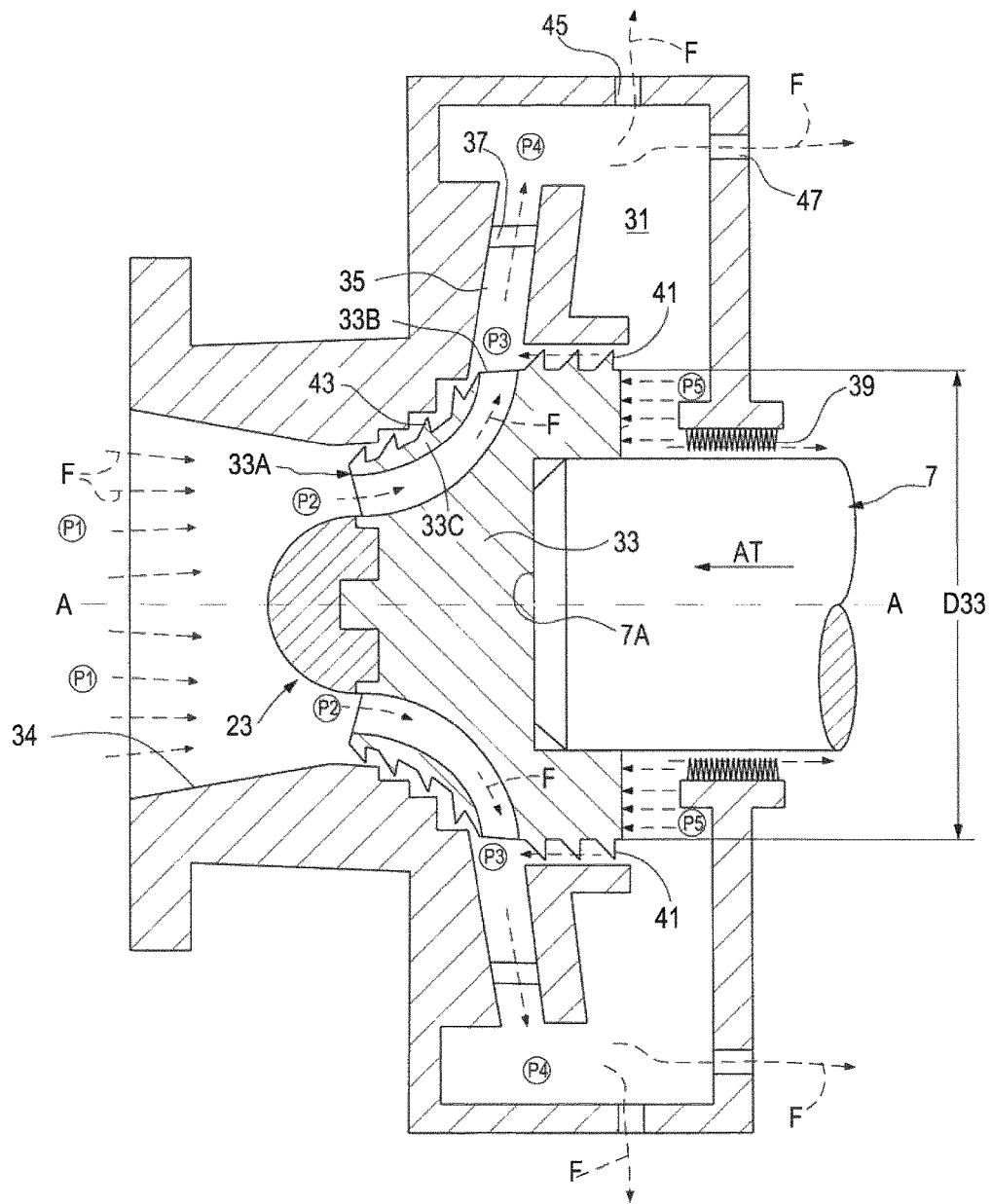
FIGS. 2, 3, 4 and 5 illustrate schematic sectional views of a cooling-gas distribution chamber arranged behind the cooling fan of the electrical machine according to different embodiments.

FIG. 2 illustrates a schematic section along a plane containing the rotation axis A-A of the cooling fan 23 and of a cooling-gas distribution chamber 31 combined thereto.

As shown in FIG. 2 an impeller 33 of the cooling fan 23 can be mounted in an overhung arrangement at one end 7A of the shaft 7 of the electrical motor 3. The impeller 33 can have a substantially axial inlet 33A and a substantially radial outlet 33B. The cooling gas flow F is delivered at the inlet 33A of the impeller 33 through an inlet manifold 34. In some embodiments, the inlet manifold 34 may have a gradually decreasing cross-section, so that the cooling gas flow F is gradually accelerated along the inlet manifold 34 with its static pressure decreasing from the manifold inlet towards the impeller inlet, as a result of the flow acceleration.

The cooling gas flow is then processed through the impeller 33 which accelerates the cooling gas flow to a high velocity, while increasing its static pressure until the impeller outlet 33B. A stationary diffuser 35 is arranged around the impeller 33 for guiding the compressed cooling gas from the impeller 33 to the cooling-gas distribution chamber 31. In some embodiments stationary diffuser blades 37 can be arranged in the stationary diffuser 35.

The cooling gas flow exiting the impeller 33 is slowed down along the stationary diffuser 35 and while flowing through the diffuser blades 37, due to the increasing cross sectional area. The static pressure of the gas flow increases correspondingly. The cooling gas flow is then received in the cooling-gas distribution chamber 31.

The cooling-gas distribution chamber 31 can extend annularly around the shaft 7 and can be sealed against the shaft by means of a suitable sealing arrangement 39. In some embodiments the sealing arrangement 39 can include a non-contact sealing arrangement, such as a labyrinth seal. The cooling-gas distribution chamber 31 is also sealed against the impeller 33. A further sealing arrangement 41 can be provided for that purpose co-acting with a stationary component of the cooling-gas distribution chamber 31. Non-contact sealing members such as a labyrinth seal can be used as the sealing arrangement 41.

A further non-contact sealing arrangement 43, such as a labyrinth seal, can be provided between a shroud 33C of the impeller 33 and the inlet manifold 34.

The cooling gas received in the cooling-gas distribution chamber 31 is then delivered through ports schematically shown at 45, 47 to the electrical motor 3, for example to the air gap 15 between the rotor 11 and the stator 13 and/or through the bearings 9A, 9B.

When the inlet manifold 34 has a cross section decreasing in the direction of the cooling gas flow, the cooling gas flow entering the inlet manifold 34 is accelerated so that the static pressure of the cooling gas decreases from an inlet value P1 to a lower value P2 at the inlet 33A of the impeller 33. The static pressure at the exit of the impeller 33 is increased at a static pressure value P3 due to the effect of the blading of the impeller 33 on the gas flow. The static pressure of the cooling gas is then further increased while the gas flows through the stationary diffuser 35 and the diffuser blades 37 to a static pressure P4. The gas flow exits the diffuser blades 37 at low velocity and enters the sealed cooling-gas distribution chamber 31, where the static pressure thereof further increases up to P5 due to partial pressure recovery after the diffuser, so that the pressure P5 in the cooling-gas distribution chamber 31 is slightly higher than the exit pressure P4 at the outlet of the diffuser 35.

The pressure P5 in the cooling-gas distribution chamber 31 is therefore substantially higher than the pressure P2 acting on the opposite side of the impeller 33. The difference between the two pressure values generates an axial force schematically represented by arrow AT acting upon the impeller 33 and therefore upon the shaft 7 whereon the impeller 33 is mounted. The axial force AT is oriented in a direction opposite the thrust $f_F$ generated by the cooling gas flow when flowing through the stator-rotor arrangement of the electric machine 3. The two axial thrusts are therefore at least partly compensated.

The impeller 33 serves as a thrust disk on the rotor 11 of the electrical motor 3 and creates an axial force in a direction opposite the flow of the cooling gas. The increasing inlet velocity along the inlet manifold 34 serves to increase the axial force or axial thrust AT for the same exit pressure P4 at the outlet of the diffuser 37 and for the same static pressure P5 in the cooling-gas distribution chamber 31 due to the increased differential pressure across the impeller 33. Increasing the diameter D33 of the back-side of the impeller 33 would also increase the axial force AT due to the increased area on the impeller disk 33 where the pressure differential is applied.

Figure 3:
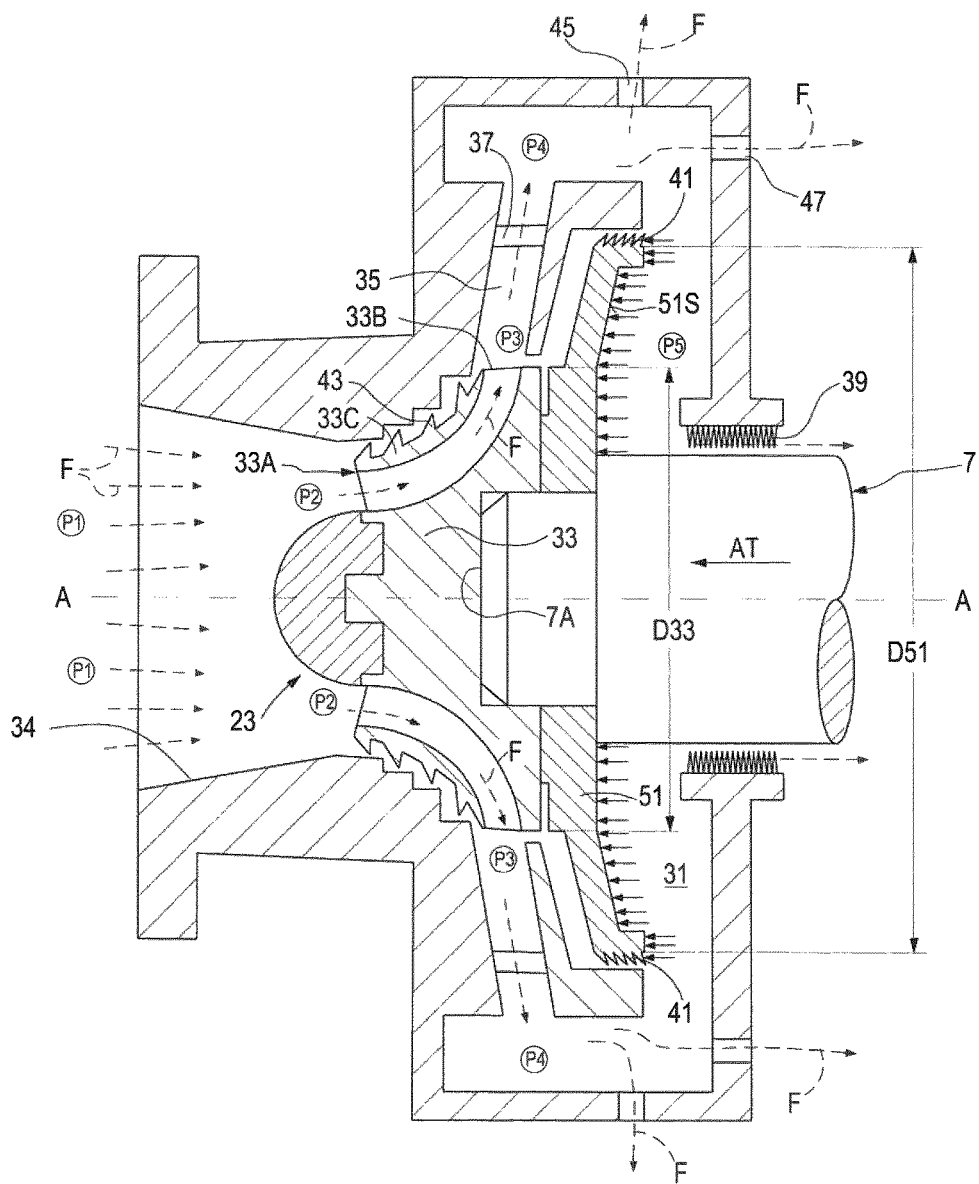

FIG. 3 illustrates a further embodiment of the impeller and relevant cooling-gas distribution chamber 31. The same reference numbers designate the same or corresponding components, parts or elements as in FIG. 2. These elements will not be described again.

In the embodiment of FIG. 3, a thrust disk 51 is added to the impeller 33 and placed on the back thereof, i.e. against surface of the impeller 33 facing the rotor-stator arrangement 11-13 of the electrical motor. 3. The thrust disk 51 can be mounted for co-rotation with the impeller 33 on the shaft 7.

The thrust disk 51 can be provided with non-contact sealing arrangement 41, e.g. co-acting with a stationary component of the cooling-gas distribution chamber 31, for sealing the cooling-gas distribution chamber 31 against the rotating arrangement formed by the thrust disk 51 and the impeller 33. The thrust disk 51 is provided with a thrust surface 51S facing the interior of the cooling-gas distribution chamber 31, upon which the static pressure P5 is applied. The diameter D51 of the thrust disk 51 can be substantially larger than the diameter D33 of the impeller 33 so that a larger axial force AT is applied on the shaft 7.

Figure 4:
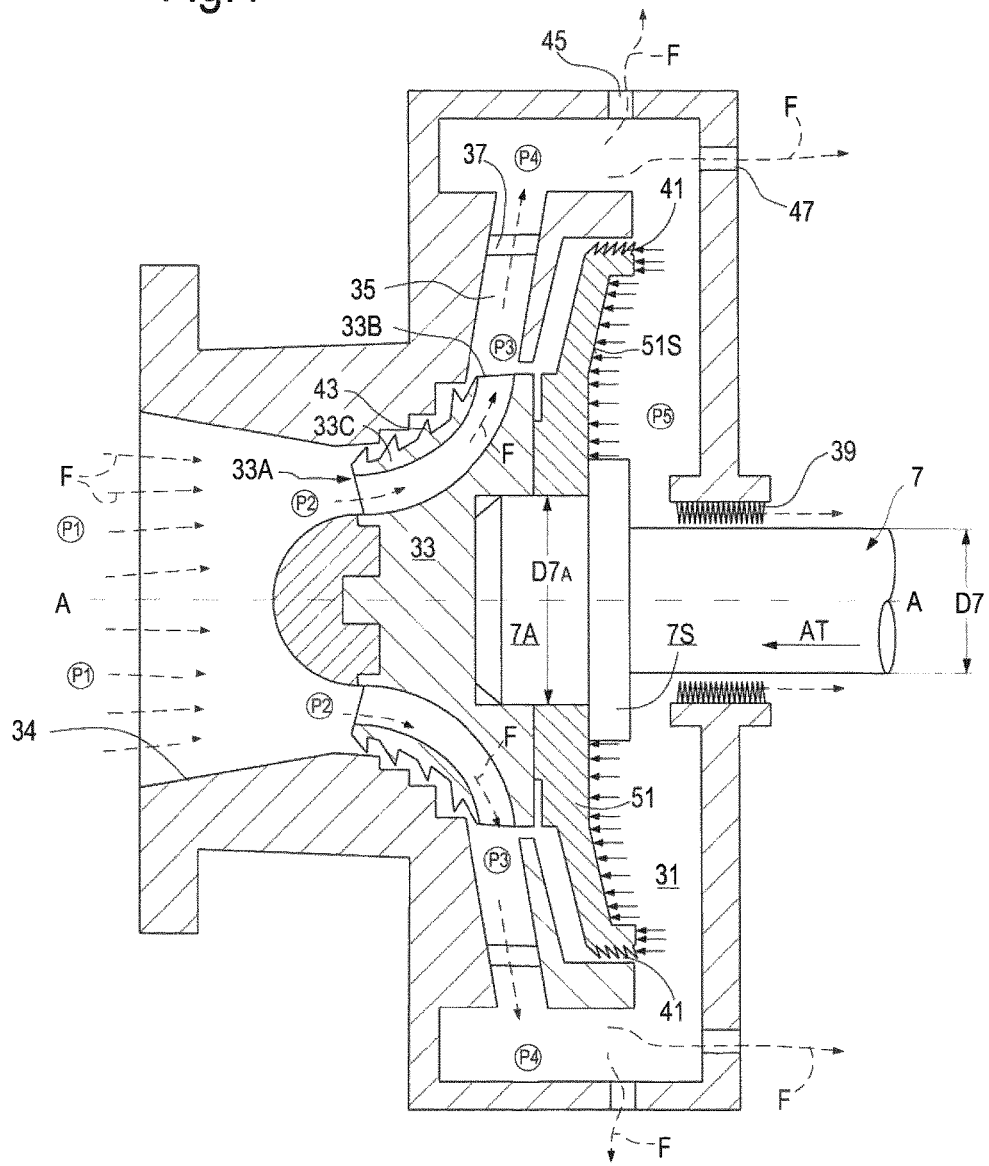

FIG. 4 schematically illustrates a further embodiment of the subject matter disclosed herein. The same reference numbers designate the same or similar components or elements as already disclosed in connection with FIGS. 2 and 3. In the embodiment of FIG. 4 the diameter of the shaft 7 under the non-contact sealing arrangement 39 has been reduced so that an additional thrust surface 7S is formed by a shoulder of the shaft 7. The end 7A of the shaft 7 can have a diameter D7A which is larger than the diameter D7 of the shaft portion extending through the sealing arrangement 39.

The total thrust action generated by the pressure differential between the cooling-gas distribution chamber 31 and the inlet 33A of the impeller 33 is thus increased.

Figure 5:
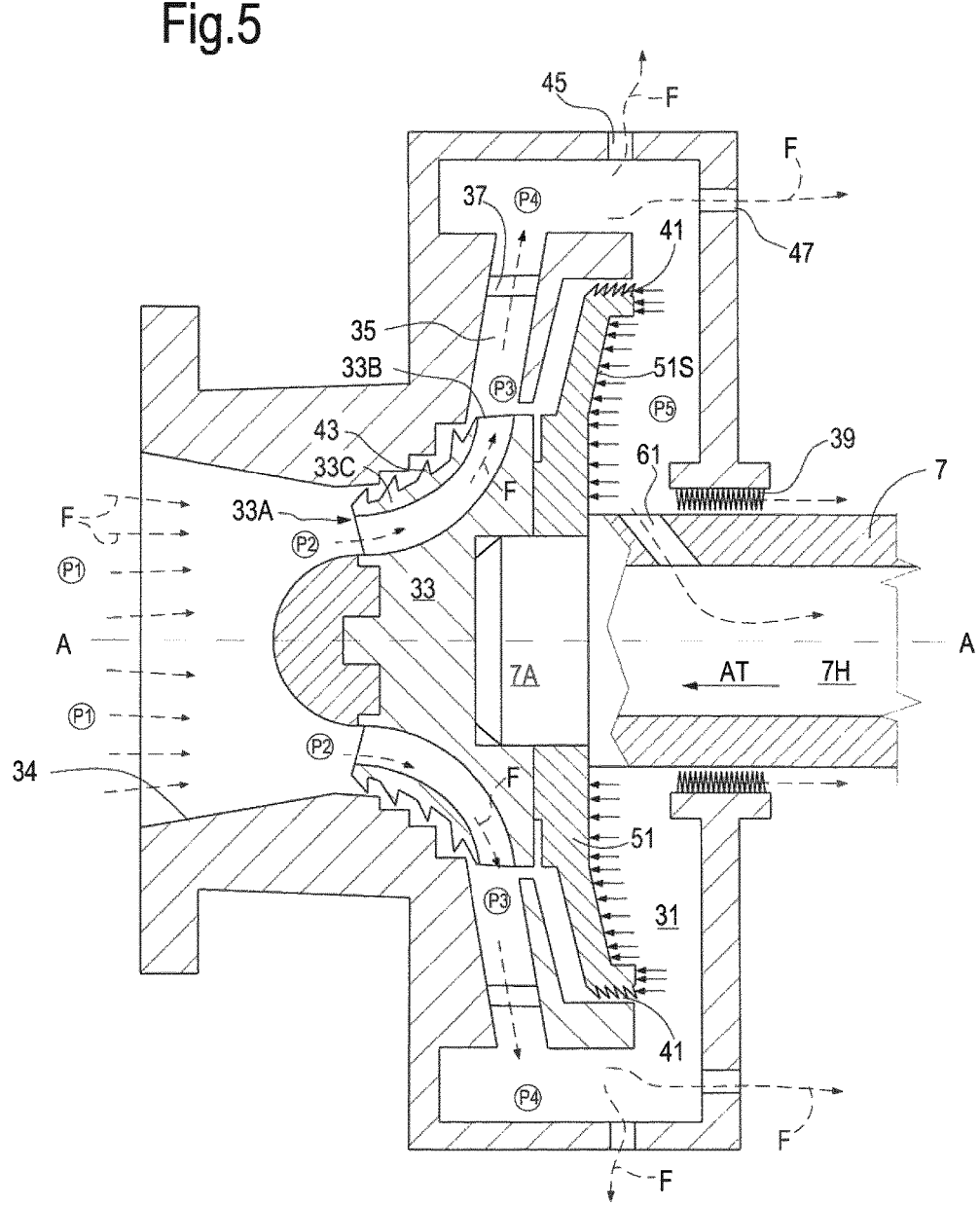

FIG. 5 illustrates a further embodiment of the subject matter disclosed herein. The same reference numbers designate the same or the similar components or elements as in the previously disclosed embodiments. These components will not be described again.

In the embodiment of FIG. 5 the shaft 7 is hollow as shown at 7H. A flow rate of cooling gas can be released from the cooling-gas distribution chamber 31 and discharged through the shaft hole 7H providing cooling of the shaft. The cooling gas flow entering the shaft hole 7H can be distributed towards the rotor magnets or winding and delivered to the drive end, i.e. towards the end facing the compressor 5, for cooling other components mounted in that area of the electric motor. One or more ports 61 can be provided between the outer surface and the inner hole 7H of the shaft 7 for fluidly connecting the cooling-gas distribution chamber 31 with the axial hole 7H of the shaft 7.

In the various embodiments described so far the sealing arrangements 41 and 43 are represented as rotating sealing members acting against a stationary surface. A reverse arrangement can clearly be provided instead, with sealing members on the stationary side and smooth or toothed matching surfaces on the rotating components. Various designs of the labyrinth seal can be used, including straight labyrinth seals, stepped labyrinths and other applicable configurations.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A rotating machinery equipment comprising a rotating electrical machine comprising:
    a stator;
    a rotating shaft;
    a rotor mounted on the rotating shaft and rotating therewith;
    a cooling fan comprised of a rotating impeller having a gas inlet and a gas outlet and mounted at a first end of the rotating shaft and rotating therewith;
    a thrust disk integrally rotating with the impeller, the thrust surface being located on the thrust disk; and
    cooling gas passages for delivering compressed cooling gas through the stator and rotor;
    wherein a cooling-gas distribution chamber is provided between the cooling fan and the stator and rotor, in fluid communication with the cooling fan and the cooling gas passages, compressed cooling gas delivered by the cooling fan being received in the cooling-gas distribution chamber and distributed therefrom to the cooling gas passages; and
    wherein the cooling fan is provided with a thrust surface facing the stator and rotor, gas pressure in the cooling-gas distribution chamber acting on the thrust surface, generating an axial force (AT) on the rotating shaft, the axial force being oriented in a direction opposite the cooling gas flow through the stator and rotor.

2. The rotating machinery equipment of claim 1, further comprising a turbomachine drivingly connected to a second end of the rotating shaft.

3. The rotating machinery equipment of claim 2, wherein a load coupling is arranged between the electrical machine and the turbomachine.

4. The rotating machinery equipment of claim 3, wherein the load coupling comprises a flexible shaft coupling.

5. The rotating machinery equipment according to claim 2, wherein the electrical machine and the turbomachine are housed in a common enclosure.

6. The rotating machinery equipment according to claim 2, wherein the electrical machine and the turbomachine are housed in separate enclosures.

7. The rotating machinery equipment according to claim 1, wherein the cooling fan comprises a stationary diffuser at the gas outlet of the impeller.

8. The rotating machinery equipment according to claim 1, further comprising an inlet manifold, through which cooling gas enters the gas inlet of the impeller, and wherein the inlet manifold has a cross section which decreases along flow direction.

9. The rotating machinery equipment of claim 1, wherein the thrust disk has an outer diameter larger than an outer diameter of the impeller.

10. The rotating machinery equipment according to claim 1, further comprising a seal, preferably a non-contact seal, more preferably a labyrinth seal, between an outer peripheral edge of the thrust disk and a stationary component of the cooling-gas distribution chamber.

11. The rotating machinery equipment according to claim 1, further comprising a seal, preferably a non-contact seal, more preferably a labyrinth seal, between an outer peripheral edge of the impeller and a stationary component of the cooling-gas distribution chamber.

12. The rotating machinery equipment according to claim 1, wherein the rotating shaft has a larger-diameter end portion, whereon the impeller is keyed, and a smaller diameter portion co-acting with a sealing arrangement, which seals the cooling-gas distribution chamber against the rotating shaft, and wherein an annular shoulder between the smaller diameter portion and the larger diameter portion forms an auxiliary thrust surface, whereon the gas pressure in the cooling-gas distribution chamber acts.

13. A method for reducing an axial thrust on a rotating machinery equipment comprising a rotating electrical machine having a stator, a rotating shaft, a rotor mounted on the rotating shaft and rotating therewith, and a cooling fan arranged for generating a pressurized cooling gas flow across a gap between the rotor and the stator, the cooling fan comprised of a rotating impeller having an impeller inlet and an impeller outlet and arranged on the rotating shaft, the method comprising:
building up a gas pressure by receiving cooling gas in a cooling-gas distribution chamber; and, with the cooling gas pressure, generating an axial force (AT) acting upon the shaft, the axial force being oriented in a direction opposite the flow direction of the cooling gas through the gap between the rotor and the stator;
accelerating a cooling gas flow in the impeller and increasing a static pressure of the cooling gas from the inlet to the outlet of the impeller;
slowing down the cooling gas flow and increasing the static pressure thereof through a diffuser arranged between the impeller outlet and the cooling-gas distribution chamber.

14. The method of claim 13, wherein the rotating machinery equipment further comprises a turbomachine, connected preferably through a load coupling to the electrical machine, and wherein the fan is mounted on the rotating shaft opposite the turbomachine.

15. A method for reducing an axial thrust on a rotating machinery equipment comprising a rotating electrical machine having a stator, a rotating shaft, and a rotor mounted on the rotating shaft and rotating therewith; the method comprising:
using a cooling fan comprised of a rotating impeller having an impeller inlet and an impeller outlet and arranged on the rotating shaft;
rotating the impeller and delivering compressed cooling gas in a cooling-gas distribution chamber;
delivering cooling gas in a cooling-gas flow direction from the cooling-gas distribution chamber towards the rotor and stator;
generating, with the compressed cooling gas in the cooling-gas distribution chamber, a balancing axial force, the balancing axial force acting on the shaft in a direction opposite a cooling-gas flow direction;
accelerating a cooling gas flow in the impeller and increasing a static pressure of the cooling gas from the inlet to the outlet of the impeller;
slowing down the cooling gas flow and increasing the static pressure thereof through a diffuser arranged between the impeller outlet and the cooling-gas distribution chamber.

16. The method of claim 15, further comprising recovering gas pressure downstream of the diffuser to increase the static pressure of in the cooling-gas distribution chamber above the static pressure of the cooling gas at the outlet of the diffuser.

17. The method of claim 15, wherein the rotating machinery equipment further comprises a turbomachine, connected preferably through a load coupling to the electrical machine, and wherein the fan is mounted on the rotating shaft opposite the turbomachine.

\* \* \* \* \*